United States Patent
Matsubara et al.

(12)

(10) Patent No.: US 6,241,790 B1
(45) Date of Patent: Jun. 5, 2001

(54) ELECTRODE, CELL USING THE SAME AND PROCESS FOR PRODUCING ELECTRODE

(75) Inventors: Takehito Matsubara; Shinichi Jinushi; Toshio Murata; Yasuaki Hiramura; Yasuyuki Ida; Kazuya Miyazaki; Yasuaki Ito; Saburo Komai; Haruhiko Takemura, all of Kyoto (JP)

(73) Assignees: Japan Storage Battery Co., Ltd.; GS-Melotec Co., Ltd., both of Kyoto (JP)

( * ) Notice: Subject to any disclaimer, the term of this patent is extended or adjusted under 35 U.S.C. 154(b) by 0 days.

(21) Appl. No.: 09/218,451

(22) Filed: Dec. 22, 1998

(30) Foreign Application Priority Data

| Dec. 22, 1997 | (JP) | ................................................ | 9-365583 |
| Dec. 22, 1997 | (JP) | ................................................ | 9-365584 |
| Dec. 22, 1997 | (JP) | ................................................ | 9-365585 |
| Feb. 27, 1998 | (JP) | ................................................ | 10-063974 |

(51) Int. Cl.[7] .............................. H01M 6/00; H01M 4/02; H01M 4/74

(52) U.S. Cl. ................... 29/623.1; 429/211; 429/236; 429/241

(58) Field of Search .................... 29/623.1; 429/211, 429/236, 241

(56) References Cited

U.S. PATENT DOCUMENTS

| 5,077,153 | | 12/1991 | Grange-Cossou et al. | .......... 429/211 |
| 5,154,993 | * | 10/1992 | Beatty | .................. 429/211 |
| 5,578,397 | | 11/1996 | Verhoog et al. | ................... 429/211 |
| 5,681,670 | * | 10/1997 | Kobayashi | ............................ 429/208 |
| 6,025,095 | * | 2/2000 | Kawamura | ........................... 429/235 |

OTHER PUBLICATIONS

Patent Abstracts of Japan, vol. 012, No. 254 (E–634), Jul. 16, 1988 & JP 63 040254 A (Sanyo Electric Co., LTD.) Feb. 20,1988 *Abstract.
Patent Abstracts of Japan, vol. 012, No. 330 (E–655) Sep. 9, 1988 & JP 63 094558 A (Sanyo Electric Co., LTD.) Apr. 25, 1988 *Abstract.

* cited by examiner

*Primary Examiner*—Gabrielle Brouillette
*Assistant Examiner*—Tracy Dove
(74) *Attorney, Agent, or Firm*—Sughrue, Mion, Zinn, Macpeak & Seas, PLLC (57) ABSTRACT

In a process for the production of an electrode for cell, a three-dimensional porous metal substrate is filled with an active material filler containing an active material. Then, heat and ultrasonic vibration is applied in order to denature or deform the active material filler to the substrate at a predetermined point where a collector leading portion is formed to remove the active material filler.

16 Claims, 6 Drawing Sheets

ELECTRODE, CELL USING THE SAME AND PROCESS FOR PRODUCING ELECTRODE

BACKGROUND OF THE INVENTION

1. Field of the Invention

The present invention relates to an electrode using a three-dimensional porous metal substrate, a cell using the electrode and a process for producing an electrode for a cell.

2. Description of the Related Art

One of the electrode structures for an alkali storage battery includes a three-dimensional porous metal substrate, such as foamed nickel filled in an active material. An electrode having such a structure has reduced strength and electrical conductivity in its substrate, as compared with a sintered electrode having a core metal plate. This type of an electrode is produced by a process consisting of filling a substrate entirely with an active material, removing the active material from a part of the substrate by applying an ultrasonic vibration or the like, welding a collector tab to the part of the substrate, and then connecting the substrate to an electrode terminal via the collector tab.

Figure 3A:
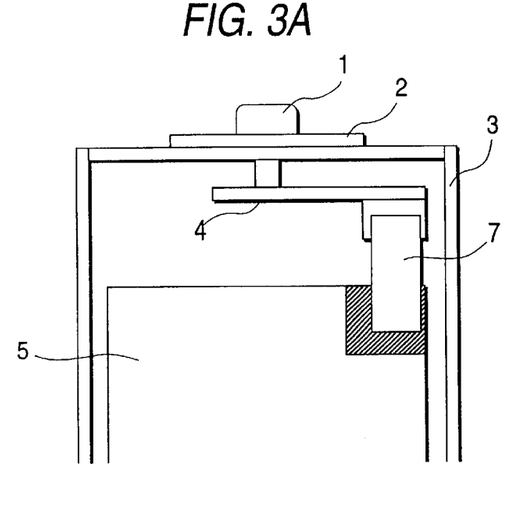
FIGS. 3A and 3B are sectional views illustrating an example of the structure having an electrode connected to an electrode terminal.
Figure 3B:
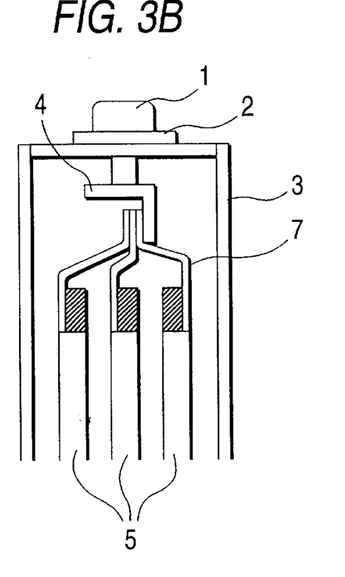

FIGS. 3A and 3B are sectional views illustrating an example of the structure comprising the foregoing electrode connected to an electrode terminal. FIG. 3A is a sectional view obtained by cutting the electrode parallel to the surface of the electrode. FIG. 3B is a sectional view obtained by cutting the electrode perpendicularly to the surface of the electrode. A collector tab 7 is welded to a metal terminal plate 4 having a rising portion that is provided inside the cell. The metal terminal plate 4 having a rising portion provided inside the cell is connected to a positive electrode terminal 1. A collector tab 7 is connected to the metal terminal plate 4. In this arrangement, an electrode 5 is connected to the metal terminal plate 4 via the collector tab 7. In FIGS. 3A and 3B, the shaded portion indicates the portion of the electrode 5 where an active material has been removed. Reference numerals 2 and 3 represent an insulating packing and a cell case, respectively.

A cell needs to satisfy requirements that it has a capacity as high as possible and is provided at a low price. The foregoing process involves the removal of an active material from a part of the substrate, and then, a collector tab is connected thereto. Accordingly, the process cannot provide effective utilization of a region from an active material that has been removed, preventing the enhancement of capacity. The additional process of attaching a collector tab adds to the production cost.

Further, this type of an electrode can be produced using a relatively easy process. This type of an electrode can provide good electricity-collecting properties even if an active material having a low electrical conductivity is used. This type of an electrode is also advantageous in that it can provide a cell having an enhanced capacity.

However, a collector leading portion for conducting current can hardly be provided on the electrode prior to the filling of an active material. Therefore, a process normally employed includes filling the entire substrate with an active material, removing the active material from the substrate at a predetermined area, and then connecting a collector member to the area to form a collector leading portion.

If a collector lead is connected by this process, the active material or a resin used for retaining the active material must be completely removed from the surface of the substrate. As a preferred process for removing an active material, ultrasonic vibration is applied to the substrate at a predetermined point.

In order to produce a cell having a capacity density as large as possible, the substrate should be filled as much as possible with an active material. In order to meet this demand, various countermeasures have been worked out. For example, the distribution of particle diameters of active material is adjusted. The amount of binder resin is reduced. A three-dimensional porous metal substrate skeleton is finely divided. The weight of the three-dimensional porous metal substrate is reduced. The three-dimensional porous metal substrate filled with an active material is reduced. The pressing pressure is increased in an electrode containing the foregoing three-dimensional porous metal substrate filled with an active material. These countermeasures have successfully made it possible to gradually increase the cell capacity.

On the other hand, however, as the packing density of active material filler in the substrate increases, there tends to be an increase in the percentage of defects occurring during the production process. The reason for this phenomenon was investigated and it was found that as the packing density increases, the active material can be retained more rigidly in the substrate. Thus, the active material can hardly be removed by physical methods, such as ultrasonic vibration. The active material cannot be completely removed from the predetermined surface of the substrate. Thus, the collector member connected to the substrate suffers from a deteriorated connection strength. As a result, a defect such as disconnection of the collector member can occur at the subsequent process of cell assembly.

In order to inhibit the occurrence of such a defect, some countermeasures have been studied. Namely, the intensity of ultrasonic vibration is increased during the removal of active material, and the energy for spot welding or ultrasonic welding for connection of collector member is increased.

However, the approach involving the increase of the intensity of ultrasonic vibration during the removal of active material causes the following problems. For example, the three-dimensional porous metal substrate can be damaged. The strength of the substrate deteriorates where the collector member is connected. As a result, cutting the substrate around the connection point causes the collector member to fall off. Thus, this approach cannot give a good solution to the problems. Further, the approach involving increasing the energy for connection of collector member has the following disadvantages. Namely, since the strength of the substrate or the like is limited, the intensity of energy to be applied cannot be raised beyond some value. Further, if the intensity of energy is raised beyond some value, energy is wasted. Thus, this approach cannot give a good solution to the foregoing problems. Moreover, an approach has been studied for removing a binder resin alone with a solvent to reduce the retaining force of an active material, and then removing the active material. However, since a high capacity electrode contains a very large amount of a binder to have an enhanced packing density of active material and the majority of the retaining force of the active material greatly depends on the pressure developed by pressing the substrate, this approach involving the treatment of the binder exerts little effect.

SUMMARY OF THE INVENTION

It is an object of the present invention to provide an electrode and a cell wherein the electrode is capable of making an effective use of electrode area to eliminate the step of attaching the electrode to the terminal.

It is another object of the present invention to provide a process for the production of an electrode for a cell which is capable of efficiently and completely removing an active material filler from a three-dimensional porous metal substrate filled with the active material filler at a predetermined point.

An electrode according to the present invention comprises a three-dimensional porous metal substrate filled with an active material filler, which has a main body portion filled with the active material filler and an ear portion where the three-dimensional porous metal substrate is exposed, the ear portion having a width narrower than the main body portion.

A cell according to the present invention comprises an electrode having a three-dimensional porous metal substrate filled with an active material filler, the electrode having a main body portion filled with the active material filler and an ear portion having the three-dimensional porous metal substrate exposed, the ear portion having a width narrower than the main body portion, and an electrode terminal comprising a metal terminal plate having a rising portion inside the cell, the ear portion being connected to the metal terminal plate.

According to the present invention, a process for the production of an electrode for the cell includes the steps of: filling a three-dimensional porous metal substrate with an active material filler containing an active material; and applying heat and an ultrasonic vibration in order to denature or deform the active material filler to the substrate at a predetermined point where a collector leading portion is formed to remove the active material filler.

DETAILED DESCRIPTION OF THE INVENTION

A detailed description of the present invention will be described as follows, referring to the accompanying drawings.

First Embodiment

The first embodiment of the present invention provides an electrode structure having a three-dimensional porous metal substrate filled with an active material filler, which is composed of a main body portion filled with the active material filler and an ear portion where the three-dimensional porous metal substrate is exposed, the ear portion having a width narrower than the main body portion.

In the first aspect of this embodiment, a cell has an electrode and an electrode terminal. The electrode contains a three-dimensional porous metal substrate filled with an active material filler. The electrode is composed of a main body portion filled with the active material filler and an ear portion where the three-dimensional porous metal substrate is exposed. The ear portion has a width narrower than the main body portion. The electrode terminal has a metal terminal plate with a rising portion inside the cell, and the ear portion is connected to the metal terminal plate.

In the second aspect of this embodiment, a cell has an electrode and an electrode terminal. The electrode contains a three-dimensional porous metal substrate filled with an active material filler. The electrode is composed of a main body portion filled with the active material filler and an ear portion where the three-dimensional porous metal substrate is exposed. The electrode has a width narrower than the main body portion. The electrode terminal has a metal terminal plate provided inside the cell. One end of a metal foil intermediate lead, having a thickness of not more than 0.08 mm, is connected to the metal terminal plate and the other end is connected to the ear portion of the electrode.

The three-dimensional porous metal substrate used in this embodiment is a substrate made of a metal skeleton having a number of three-dimensionally arranged pores which are large enough to be filled with an active material filler. Examples of the three-dimensional porous metal substrate include sintered metallic fiber, metallic felt such as nickel felt, and foamed metal. The kind of substrate to be used herein is properly selected depending on the kind of the electrode. If a nickel hydroxide electrode for nickel-hydrogen cell is produced, a substrate having a nickel skeleton is desired. In particular, a plated three-dimensional porous nickel substrate having a metal skeleton formed by plating, such as one produced by plating a porous foamed product, is more desirable. The plated three-dimensional porous nickel substrate, if used, preferably has a nickel weight of from 400 to 600 $g/m^2$.

The active material filler with which the foregoing three-dimensional porous metal substrate is filled is mainly composed of an active material, optionally having a binder such as resin, an electrically-conductive material and other additives added thereto. For example, the active material filler with which a nickel hydroxide electrode for a nickel-hydrogen cell is filled is mainly composed of a powdered nickel hydroxide ($Ni(OH)_2$) as an active material having an electrically-conductive material such as graphite and metallic nickel, a thickening agent such as CMC and MC or a binder resin such as PFD and PTFE is added thereto, optionally having an additive such as nickel oxyhydroxide (NiOOH) powder and cobalt hydroxide powder added thereto. The filling of the active material filler may be carried out by subjecting the substrate to coating, impregnation or spraying with a paste obtained by adding, or the like, to the foregoing active material filler. In practice, however, the substrate thus treated is preferably dried and then pressed to obtain a higher electrode density.

The ear portion of the electrode of this embodiment acts as a collector tab. In order to maintain its collecting properties and strength of connection to the electrode terminal, the ear portion of the electrode is preferably pressed to have an enhanced density of metal skeleton and a reduced thickness, as compared with the main body portion of this embodiment. However, if pressing is too strong, the strength of the border of the ear portion with the main body portion becomes weak. Thus, pressing needs to be effected properly. Pressing is preferably effected such that the difference in thickness between the main body portion and the ear portion is not too large. The density of the ear portion thus pressed, if a plated three-dimensional porous nickel substrate is used, is preferably from 0.83 to 5 $g/cm^3$ from the standpoint of lowest allowable value for sufficient electronic conductivity and upper value which can be easily obtained by pressing.

As mentioned above, the electrode of this embodiment has an ear portion formed integrally therewith to provide a portion corresponding to the collector tab. Accordingly, a cell provided with this electrode requires no procedure of attaching a collector tab during its production. Accordingly, it is possible to simplify the production process and reduce the production cost. Further, there is not a necessity of removing an active material from the electrode at a region for attachment of a collector tab. Accordingly, the main body portion can be used efficiently as an active electrode portion. Accordingly, it is possible to provide an increased capacity and enhanced percentage of utilization of active material.

The electrode of this embodiment is preferably used such that the density of current flowing through the ear portion is not more than 800 A per net unit sectional area of the metal constituting the ear portion (i.e., not more than 800 $A/cm^2$). Using the electrode of this embodiment within this range makes it possible to secure sufficient discharge capacity. Further, if a plated three-dimensional porous nickel substrate is used, it is preferred that the nickel weight be from 400 to 600 $g/m^2$, that the density of current flowing through the ear portion be no more than 800 A per net unit sectional area of the metal constituting the ear portion (i.e., not more than 800 $A/cm^2$) and that the density of the ear portion be from 0.83 to 5 $g/cm^3$.

The formation of the ear portion as an exposed area of the three-dimensional porous metal substrate can be hardly accomplished by a process which includes preparing a three-dimensional porous metal substrate composed of a main body portion and an ear portion, and then filling the three-dimensional porous metal substrate with an active material filler at the main body portion alone except the ear portion. Therefore, a process is preferably used which includes filling a three-dimensional porous metal substrate formed of a main body portion and an ear portion having a width narrower than the main body portion entirely with an active material filler to prepare an electrode parent body, and then removing the active material filler from the electrode parent body at the ear portion. In this process, the removal of the active material filler needs to be effected such that the three-dimensional porous metal substrate is exposed to an extent that sufficient electrical and mechanical connection, such as welding, can be effected. More preferably, the active material filler should be completely removed. Further, it suffices that the substrate is exposed at least at the ear portion. The substrate may be unfilled with the active material filler at the portion other than the ear portion. The substrate may be exposed at the portion other than the ear portion.

The removal of the active material filler from the three-dimensional porous metal substrate which is entirely filled with the active material filler at the ear portion is preferably carried out by a process which includes applying heat and an ultrasonic vibration causing the denaturation or deformation of the active material filler to the ear portion of the electrode parent body to remove the active material filler therefrom. To its advantage, the electrode thus produced exhibits excellent mechanical strength at the ear portion. This process is desirable when the void of the main body portion filled with the active material filler is not more than 30%, and even more desirable when the void of the main body portion filled with the active material filler is not more than 28%.

The foregoing process which includes preparing an electrode parent body having a three-dimensional porous metal substrate composed of a main body portion and an ear portion having a width narrower than the main body portion filled with an active material filler, and then applying heat and an ultrasonic vibration causing the denaturation or deformation of the active material filler from the ear portion of the electrode parent body to remove the active material filler from the ear portion, is intended to apply heat to the ear portion. Therefore, a thermal deformation, or the like, is provided to cause a change in the contact condition of the active material, or the like, and to reduce the retaining force of the active material. In other words, heat is applied to the three-dimensional porous metal substrate or the active material filler. The three-dimensional porous metal substrate thermally expands or at least one component of the active material filler is denatured or deformed to reduce the retaining force of the active material filler with respect to the three-dimensional porous metal substrate. As a result, it can be removed from the three-dimensional porous metal substrate by ultrasonic vibration. More effectively, the foregoing process is intended to denature or deform at least one component of the active material filler.

The three-dimensional porous metal substrate is thermally expanded to cause a shearing force between the three-dimensional porous metal substrate and the active material filler in contact therewith, and the active material filler is peeled off the surface of the three-dimensional porous metal substrate. The entire active material filler retained in the substrate is shaken to produce a new gap that reduces the retaining force of the active material filler. Accordingly, it is preferred that the temperature of the substrate is increased to enhance this effect. Further, in order to add a shrinking effect, a short cycle of temperature rise and cooling is applied. However, the temperature rise is preferably increased to a proper value based on the kind of material so that the strength and electrical conductivity of the substrate are not deteriorated.

The denaturation of at least one component of the active material filler is intended to cause a change resulting in the reduction of the binding power of one component with another or with the substrate. Hence, the retaining force of the active material filler is dropped. Further, the denaturation of at least one component of the active material filler causes a change in the filling condition of the active material filler or causes the production of a new gap or shift causing the active material filler to be peeled off the substrate to reduce the retaining force of the active material filler. This deformation is produced not only by thermal expansion and thermal shrinkage but also by denaturing similarly to the substrate. In particular, an active material filler having a high proportion of active material is expected to see an important role of the denaturation and deformation of active material. In this case, the thermal oxidation or reduction reaction of the active material is important. Thus, the temperature or atmosphere, such as an oxygen atmosphere and a hydrogen atmosphere, is adjusted depending on the kind of the active material.

Referring to the order of applying heat and ultrasonic vibration, it is preferred that ultrasonic vibration is not applied prior to heat to enhance the efficiency for the purpose of applying heat. Thus, ultrasonic vibration is preferably applied at the same time with or after the application of heat. If ultrasonic vibration is applied at the same time with the application of heat, the step of removing the active material filler can be advantageously effected in a short period of time. To the contrary, if the ultrasonic vibration is applied after the application of heat, a cooling effect can be exerted by adjusting the time required until the application of ultrasonic vibration or the atmospheric temperature. Accordingly, it is possible to remove the active material filler at a high energy efficiency and it is easy to adjust the heat application conditions.

There are various heat application methods such as irradiating the substrate with infrared rays or a laser beam, and spraying a flame of a burner onto the substrate. The temperature of the heat thus applied is preferably so that the active material filler can be denatured or deformed. If a nickel hydroxide electrode containing nickel hydroxide as a main active material is produced, the temperature of the heat thus applied is preferably not lower than 100° C., at which the water of crystallization can be removed, and more preferably not lower than 220° C. at which nickel hydroxide becomes nickel oxide. Alternatively, if the active material filler contains some resin, the temperature of the heat thus applied is even more preferably not lower than 250° C. This applies when the active material filler contains a thickening agent such as CMC and MC or a binder resin such as PFD and PTFE. Further, the upper limit of the temperature of the heat thus applied is preferably not higher than 650° C. if the substrate is a three-dimensional porous metal substrate made of metallic nickel. In particular, if the substrate is a three-dimensional porous metal substrate made of a skeleton formed by plating such as foamed nickel, this temperature is desirable. This is because if the heating time is prolonged at a temperature higher than this temperature, it causes the denaturation of the substrate in addition to the denaturation and deformation of the active material filler, resulting in a drop of strength and electrical conductivity. Further, if nickel hydroxide is used, heating may be effected in the atmosphere. In this case, the facilities to be used may be advantageously simplified.

The cell according to the first aspect of this embodiment can be produced by connecting a metal terminal plate to the electrode of the embodiment at the ear portion thereof. The connection of the metal terminal plate to the electrode may be carried out by using an electrically-conductive solder or resin. In practice, however, spot welding, ultrasonic welding, or laser welding may be used. In order to effect this welding rigidly without impairing the electrical conductivity, it is preferred that the surface of the ear portion is as clean as possible and is free of electrical conductivity-impairing film, such as oxide layer. This is because the existence of such a surface condition makes it possible to realize a rigid connection having a good electrical conductivity and reduce the energy required for the connection. Accordingly, as mentioned with reference to the electrode of the embodiment, it is more desirable that an electrode is produced by a process which includes preparing an electrode parent body made of a three-dimensional porous metal substrate composed of a main body portion and an ear portion having a width narrower than the main body portion filled with an active material filler, and then applying heat and an ultrasonic vibration causing the denaturation or deformation of the active material filler to the ear portion of the electrode parent body to remove the active material filler from the ear portion. In this case, it is preferred that the three-dimensional porous metal substrate is a plated three-dimensional porous nickel substrate and the active material is nickel hydroxide.

The cell of this embodiment is preferably arranged such that the density of current flowing through the ear portion is not more than 800 A per net unit sectional area of the metal constituting the ear portion (i.e., not more than 800 A/cm$^2$). Further, if an electrode employing a plated three-dimensional porous nickel substrate is used, it is preferred that the nickel weight be from 400 to 600 g/m$^2$, the density of current flowing through the ear portion be not more than 800 A per net unit sectional area of the metal constituting the ear portion (i.e., not more than 800 A/cm$^2$) and the density of the ear portion be from 0.83 to 5 g/cm$^3$.

In the cell according to the second aspect of this embodiment, the foregoing electrode of the embodiment is connected to the metal terminal plate via a metal foil intermediate lead. Since the metal foil intermediate lead is enclosed warped in the cell, the ear portion of the electrode is subject to stress such as bending and compression from the metal foil intermediate lead. Therefore, if this stress is too large, the ear portion of the electrode is deformed, producing defective cells. In order to reduce this stress sufficiently, a metal foil intermediate lead made of nickel having a thickness of not more than 0.08 mm is used. The preferred form of the electrode used is the same as that of the cell according to the first aspect of this embodiment. Thus, the use of the metal foil intermediate lead having a thickness of not more than 0.08 mm makes it possible to produce cells in a good yield. In particular, if an electrode made of a plated three-dimensional porous nickel substrate is used, it is preferred that the nickel weight be from 400 to 600 g/m$^2$ and the thickness of the metal foil intermediate lead be not more than 0.08 mm, more preferably not more than 0.05 mm.

The cell of this embodiment is preferably arranged such that the density of current flowing through the ear portion is not more than 800 A per net unit sectional area of the metal constituting the ear portion (i.e., not more than 800 A/cm$^2$). Further, if an electrode made of a plated three-dimensional porous nickel substrate is used, it is preferred that the nickel weight be from 400 to 600 g/m$^2$, the density of current flowing through the ear portion be not more than 800 A per net unit sectional area of the metal constituting the ear portion (i.e., not more than 800 A/cm$^2$) and the density of the ear portion be from 0.83 to 5 g/cm$^3$.

EXAMPLE 1

The electrode of this embodiment will be further described in the following examples.

90 parts by weight of a particulate nickel hydroxide active material having an average particle diameter of 10 $\mu$m and 10 parts by weight of a particulate cobalt hydroxide having an average particle diameter of 5 $\mu$m were dispersed in a 0.5 wt-% aqueous solution of carboxymethyl cellulose (CMC) to prepare a paste. The paste thus prepared was applied to a foamed nickel having a porosity of 95% and a weight of 500 g/m² (trade name: Cermet, produced by Sumitomo Electric Industries, Ltd.) so that the foamed nickel was filled with the paste. The foamed nickel was dried, pressed to have an enhanced packing density, and then stamped into a rectangle having an ear portion out therefrom to prepare an electrode parent body. The size of the electrode parent body except the ear portion was 15 mm×60 mm. The size of the ear portion was 3 mm (root)×5 mm. The thickness of the unpressed foamed nickel was 1.6 mm. The thickness of the pressed foamed nickel was 0.7 mm. The porosity of the pressed foamed nickel was 26%.

Figure 4A:
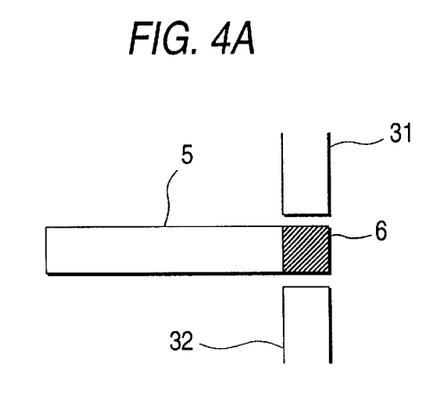
FIGS. 4A and 4B are diagrams illustrating the process of heating by a metallic trowel.
Figure 4B:
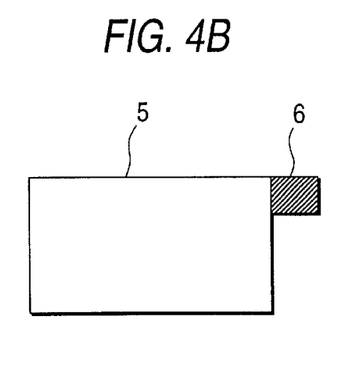
Figure 5A:
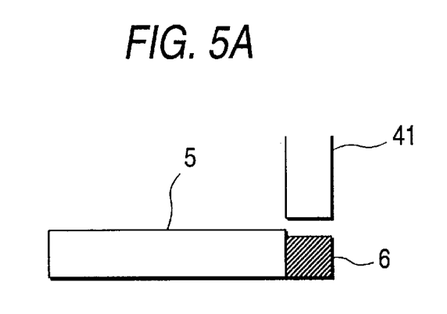
FIGS. 5A and 5B are diagrams illustrating the process of applying ultrasonic wave to remove the active material filler.
Figure 5B:
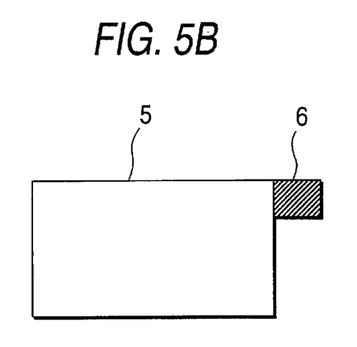

Subsequently, heat causing the denaturation or deformation of the active material filler was applied to the ear portion of the electrode parent body from a metallic trowel. Ultrasonic vibration was applied to the ear portion to remove the active material filler therefrom. FIGS. 4A and 4B are diagrams illustrating the process of heating by a metallic trowel according to this embodiment. FIGS. 5A and 5B are diagrams illustrating the process of applying an ultrasonic wave to remove the active material filler of the present example. FIGS. 4A and 5A are sectional views of the electrode, respectively. FIGS. 4B and 5B are a plan view of the electrode, respectively. The present example will be further described in connection with these drawings.

As shown in FIGS. 4A, two metallic trowels 31, 32 were prepared. The metallic trowels 31, 32 were allowed to come in contact with the ear portion 6 which acts as a collector tab in such a manner that the ear portion 6 is vertically sandwiched therebetween. The surface of the metallic trowels 31, 32 which comes in contact with the ear portion 6 is planar and its shape is rectangle. The temperature of the forward end of the metallic trowels 31, 32 is kept to 480° C. Under these conditions, the metallic trowels 31, 32 were allowed to come in contact with the ear portion 6 in the air for 3 seconds. After the heat treatment, the color of the ear portion changes from green to blackish.

Thereafter, the ear portion 6 was allowed to cool to room temperature. As shown in FIG. 5A, a Ti horn 41 was then pressed against the ear portion 6 while applying an ultrasonic wave thereto. In this manner, the active material filler was completely removed from the ear portion 6. As a result, a very clean surface of foamed nickel skeleton appeared. The thickness and density of the ear portion 6 from which the active material filler had been removed were 0.6 mm and 0.83 g/cm³, respectively. The ear portion 6 thus treated exhibited a tensile strength of not less than 0.8 kgf and a peel strength of not less than 0.5 kgf. In this embodiment, since an ultrasonic wave is applied to the ear portion, the filler can also be released from the three sides. Thus, the filler can be efficiently removed as compared with the process in which an ultrasonic wave is applied to a part of the electrode main body portion.

The cell of this embodiment will be described with reference to an example of a cell including the foregoing electrode as a positive electrode.

Figure 1A:
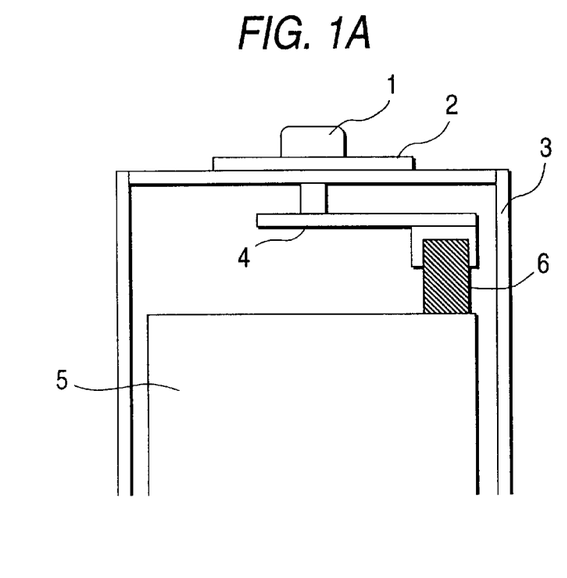
FIGS. 1A and 1B are diagrams illustrating the structure for connecting the positive electrode in a nickel-hydrogen cell having an electrode welded to a metal terminal plate having a rising portion provided inside the cell.
Figure 1B:
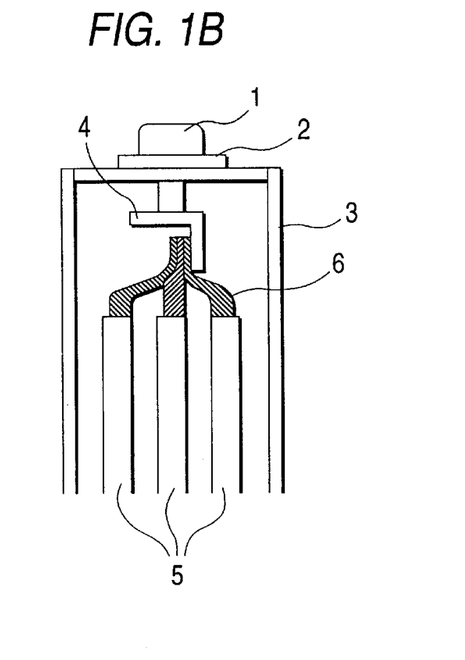

FIGS. 1A and 1B are diagrams illustrating the structure for connection of positive electrode in a nickel-hydrogen cell having the foregoing electrode welded to a metal terminal plate and having a rising portion provided inside the cell. FIG. 1A is a sectional view obtained by cutting the electrode parallel to the surface of the electrode. FIG. 1B is a sectional view obtained by cutting the electrode perpendicularly to the surface of the electrode. As shown in FIGS. 1A and 1B, a positive electrode 1 is connected to a metal terminal plate 4 having a rising portion provided inside the cell. An ear portion 6 which acts as a collector tab is connected to the metal terminal plate 4 by ultrasonic welding. In this arrangement, the electrode 5 is connected to the metal terminal plate 4 via the ear portion 6. The shade indicates the ear portion 6 of the electrode 5 from which an active material has been removed, the reference numeral 2 represents an insulating packing, and the reference numeral 3 represents a cell case.

In FIGS. 1A and 1B, no negative electrodes, separators, etc. are shown. However, the cell of the present example is made of three sheets of electrodes 5 each enclosed as a positive electrode in a bag-shaped separator (nonwoven cloth made of polyolefin) and four sheets of negative electrodes, one positioned between the electrodes 5 and one positioned on each side of the electrodes 5, filled with an aqueous solution of potassium hydroxide. The negative electrode used had been produced by dispersing 99 parts by weight of hydrogen-occluded alloy particles and 1 part by weight of carbon particles in a 1 wt-% aqueous solution of carboxymethyl cellulose to prepare a paste, applying the paste to a Ni-plated punched metal of iron, drying the coated metal, pressing the coated metal to a predetermined thickness, and then stamping almost the same size out of the material.

In the process for production of the cell, no defects occurred due to cutting of the ear portion. If foamed nickel is used, the tensile strength of the ear portion may be not less than 0.2 kgf, and preferably not less than 0.5 kgf, to prevent strength problems in a first aspect of the embodiment. It was also found that if foamed nickel is used, the thickness of the ear portion may fall within the range of from 0.10 mm to 0.6 mm to inhibit problems on the strength of connection to the metal terminal plate.

Figure 6:
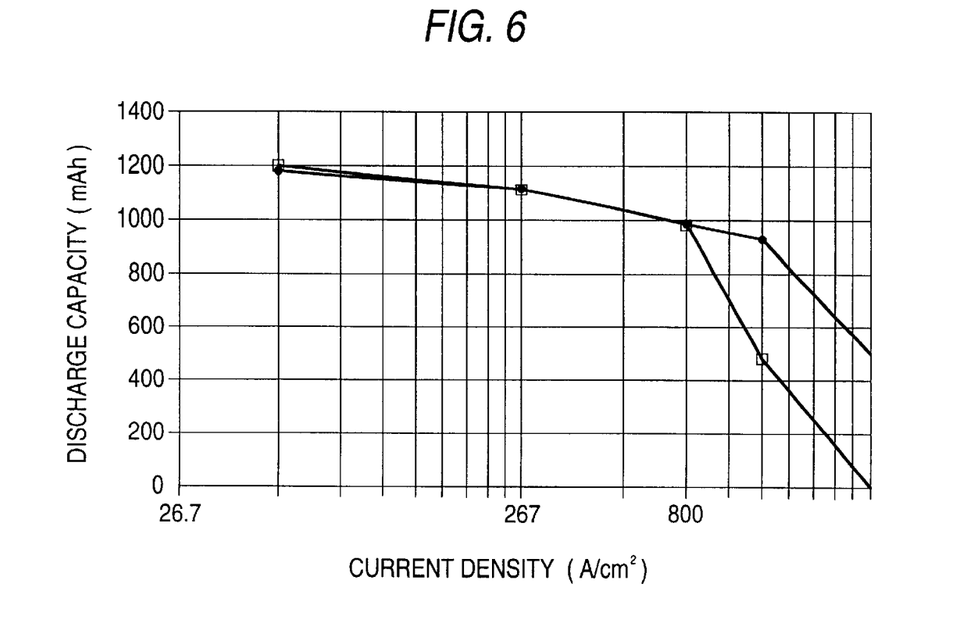
FIG. 6 is a characteristic curve illustrating the relationship between the density of current flowing through an ear portion and the discharge capacity.

FIG. 6 is a characteristic curve illustrating the relationship between the density of current flowing through the ear portion 6 and the discharge capacity. The current density is defined as the quantity of current per net unit sectional area of metal constituting the ear portion. The current density can be calculated by the following equation:

(Current density)=(Current flowing through ear portion)/(width of ear portion×× net thickness)

(Net thickness)=(Weight per area of 1 cm²)/(density of metal)

In the present example, the width and net thickness of the ear portion are 3 mm and 0.05 (weight)/8.9 (density of nickel), respectively. These values are used to calculate the current density. For evaluation of the cell characteristics, the foregoing cell was used. In some detail, the discharge capacity of the cell was measured at a temperature of 23° C. with different values of current taken out of the cell. The ordinate of the graph indicates the discharge capacity. The abscissa of the graph indicates the value obtained by dividing the foregoing current by 3 as the current flowing through the ear portion (collector tab in the case of a comparative cell) calculated by the foregoing equation.

In the graph, the square indicates the characteristics of a comparative cell produced by using the collector tab without any ear portion. The black dot indicates the characteristics of the present example. The comparative cell was similar to the cell of the present example except that a collector tab was provided. As the collector tab, there was used a nickel foil having a thickness of 30 μm and a portion protruding the electrode having a width of 3 mm and a length of 5 mm.

As shown in the graph, the cell of the present example exhibits a discharge capacity compares favorably with the comparative cell within the range where the density of current flowing through the ear portion is not more than 800 A/cm². The cell of this embodiment exhibits a great capacity as compared with the comparative cell because there is no necessity of removing the active material from the region (4 mm×4.5 mm) at which a collector tab is attached. In the graph, a correction (capacity/0.983) for the attachment of the collector tab is applied to the discharge capacity of the comparative cell to give a better understanding of the relationship between the current density and the discharge capacity.

Figure 2A:
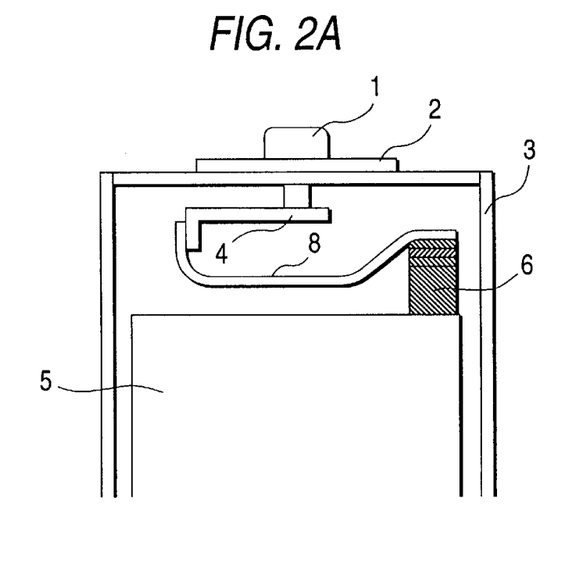
FIGS. 2A and 2B are diagrams illustrating the structure for connecting the positive electrode in a nickel-hydrogen cell having an electrode connected to a metal foil intermediate lead.
Figure 2B:
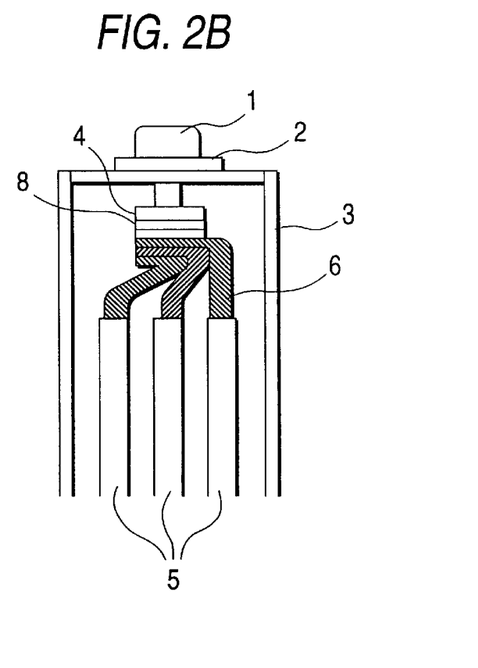

FIGS. 2A and 2B are diagrams illustrating the structure for connecting the positive electrode in a nickel-hydrogen cell made of the foregoing electrode to a metal foil intermediate lead. FIG. 2A is a sectional view obtained by cutting the electrode parallel to the surface of the electrode. FIG. 2B is a sectional view obtained by cutting the electrode perpendicularly to the surface of the electrode. As shown in FIGS. 2A and 2B, a metal terminal plate 4 inside the cell is connected to a positive electrode 1. One end of a metal foil intermediate lead 8 is connected to the metal terminal plate 4. The other end of the metal foil intermediate lead 8 is connected to the ear portion 6 of the foregoing electrode 5 by ultrasonic welding. The other structures are the same as that of the cell of the previous example as shown in FIGS. 1A and 1B.

As the metal foil intermediate lead 8, there was used a nickel foil having a width of 3 mm. When a nickel foil having a thickness of 0.1 mm was used, the ear portion 6 underwent deformation that produced some defective cells. When a nickel foil having a thickness of 0.05 mm was used, no deformation or defects occurred. Further, when a nickel foil having a thickness of 0.08 mm was used, no defects occurred but the intermediate lead was too hard to give good handleability. The thickness of the nickel foil deviated about 0.01 mm from the desired value. For example, a group of nickel foils having a nominal thickness of 0.08 mm included some samples having a thickness of 0.09 mm.

Using the electrode of this embodiment makes it possible to effectively use the electrode area and eliminate the step of attaching the electrode to terminal. Further, using the electrode of this embodiment makes it possible to produce a cell having a greater capacity and fewer number of required production steps than the conventional cell.

Second Embodiment

According to the first aspect of the second embodiment, a process for producing an electrode for a cell is performed in the following manner. First, a three-dimensional porous metal substrate is filled with an active material filler containing an active material. Thereafter, heat for denaturing or deforming mainly the active material filler and an ultrasonic vibration for removing mainly the active material filler is applied to the substrate to remove the active material filler. Then, a collector member is electrically connected to the substrate at the predetermined point where the active material filler has been removed.

In other words, the concept of the first aspect of the second embodiment is to apply heat to the three-dimensional porous metal substrate at a predetermined point, thereby giving a thermal deformation, or the like, and causing a change in the contact condition of the active material, or the like, to reduce the retaining force of the active material. In other words, heat is applied to the three-dimensional porous metal substrate or the active material filler so that the three-dimensional porous metal substrate is thermally expanded. Alternatively, at least one component of the active material filler is denatured or deformed to reduce the retaining force of the active material filler with respect to the three-dimensional porous metal substrate. As a result, it can be removed from the three-dimensional porous metal substrate by ultrasonic vibration. More effectively, the foregoing process is intended to denature or deform at least one component of the active material filler.

The three-dimensional porous metal substrate is thermally expanded to cause a shearing force between the three-dimensional porous metal substrate and the active material filler in contact therewith so that the active material filler is peeled off the surface of the three-dimensional porous metal substrate. The entire active material filler retained in the substrate is shaken to produce a new gap that reduces the retaining force of the active material filler. Accordingly, in order to enhance this effect, it is preferred that the temperature of the substrate be raised higher. Further, in order to add a shrinking effect, the cycle of temperature rise and cooling is preferably short. However, the temperature rise is preferably effected up to a proper value depending on the kind of the material so that the strength and electrical conductivity of the substrate are not deteriorated.

An active material filler is mainly composed of an active material (optionally an active material alone) having a binder such as resin, an electrically conductive material and other additives. At least one component of the active material filler is denatured to cause a change resulting in the reduction of the binding power of one component with another or with the substrate. Hence, the retaining force of the active material filler is dropped. Further, at least one component of the active material filler is denatured to cause a change in the filling condition of the active material filler or to cause production of a new gap or shift, causing the active material filler to be peeled off the substrate to reduce the retaining force of the active material filler. This deformation is produced not only by thermal expansion and thermal shrinkage but also by denaturing similarly to the substrate. In particular, an active material filler having a high proportion of active material is expected to see an important role of the denaturation and deformation of active material. In this case, the thermal oxidation or reduction reaction of the active material is important. Thus, the temperature or atmosphere, such as an oxygen atmosphere and a hydrogen atmosphere, is adjusted depending on the type of the active material.

Referring to the order of applying heat and ultrasonic vibration, it is preferred that ultrasonic vibration is not applied prior to heat to enhance the efficiency for the purpose of applying heat. Thus, ultrasonic vibration is preferably applied at the same time as, or after, the application of heat. If ultrasonic vibration is applied at the same time with the application of heat, the step of removing the active material filler can be advantageously effected in a short period of time. To the contrary, if ultrasonic vibration is applied after the application of heat, a cooling effect can be exerted by adjusting the time required until the application of ultrasonic vibration or the atmospheric temperature. Accordingly, it is possible to remove the active material filler at a high energy efficiency and it is easy to adjust the heat application conditions.

In a process for the production of an electrode for a cell according to the second aspect of this embodiment, heat is applied to cause the denaturation or deformation of mainly the active material filler to the substrate at a predetermined point from a solid heating member being in contact therewith. In other words, the process of the second aspect of this embodiment is characterized by a heating process. The use of a solid heating member makes it easy to determine the dimension of the heating site. Therefore, it is possible to prevent heating of excess sites. Further, the temperature of the solid heating member can be easily controlled to a predetermined value. Consequently, it is easy to control the temperature of the heat applied to the electrode and it is possible to enhance the reliability of heat treatment.

The second embodiment will be further described with reference to an example of nickel hydroxide electrode for nickel-hydrogen cell, etc.

For the three-dimensional porous metal substrate, there may be used a sintered metal fiber or foamed metal. If a nickel hydroxide electrode is produced by the process according to this embodiment, a plated three-dimensional porous nickel substrate, such as foamed nickel produced by Sumitomo Electric Industries, Ltd., is preferably used to make the best use of this embodiment.

The active material filler is mainly composed of powdered nickel hydroxide ($Ni(OH)_2$) having an electrically conducting agent such as graphite, metallic nickel and cobalt compound (e.g., cobalt hydroxide, metallic cobalt) added thereto by various methods with a thickening agent such as CMC and MC or a binder resin such as PFD and PTFE properly added thereto, optionally having additives such as nickel oxyhydroxide (NiOOH) added thereto. Water or the like is added to the active material filler to make a paste which is then applied to the three-dimensional porous metal substrate so that the substrate is filled with the paste. The substrate is dried, and then pressed to have an enhanced packing density. Thus, an electrode is produced. For example, 100 parts by weight of powdered nickel hydroxide ($Ni(OH)_2$), 15 parts by weight of powdered nickel oxyhydroxide (NiOOH) and a 0.4 wt-% aqueous solution of carboxymethyl cellulose (CMC) are mixed to prepare a paste. The paste is applied to a foamed nickel plate which is then dried and pressed.

Subsequently, a collector member such as collector tab made of nickel foil is electrically connected to the foregoing electrode. The electrical connection of the collector member to the electrode may be carried out by using an electrically-conductive solder or resin. In practice, however, spot welding, ultrasonic welding, or laser welding may be used. In order to effect this welding rigidly without impairing the electrical conductivity, it is necessary to remove the active material filler from the connection site to allow the metallic substrate to be exposed at the connection site. Further, it is preferred that the surface of the connection site is as clean as possible and is free of electrical conductivity-impairing film, such as an oxide layer. This is because the existence of such a surface condition realizes a rigid connection having good electrical conductivity and reduces the energy required for connection.

In this embodiment, a solid heating member contacts the substrate at a point where the collector member is connected so that the substrate is heated to remove the active material filler. Heat can be applied by irradiating the substrate with infrared rays or laser beam or spraying the flame of a burner onto the substrate. However, the foregoing process involving the contact of a solid heating member is preferred.

The region of the substrate to which heat is applied is preferably slightly greater than the connecting site of the collector member taking into account the margin for connection of the collector member. Thus, the area of the surface of the solid heating member in contact with the substrate is preferably greater than that of the connecting site of the collector member. The shape of the surface of the solid heating member in contact with the substrate is preferably similar to that of the connecting site of the collector member for the purpose of minimizing the extra area. Further, the shape of the collector member is preferably rectangle from the standpoint of production efficiency. Accordingly, the surface of the solid heating member in contact with the substrate is also preferably rectangular.

The temperature of the heat thus applied is preferably such that the active material filler can be denatured or deformed. If a nickel hydroxide electrode containing nickel hydroxide as a main active material is produced, the temperature of the heat thus applied is preferably not lower than 100° C., at which the water of crystallization can be removed, and more preferably not lower than 220° C., at which nickel hydroxide becomes nickel oxide. Alternatively, if the active material filler contains some resin, the temperature of the heat thus applied is even more preferably not lower than 250° C. This can apply when the active material filler contains a thickening agent such as CMC and MC or a binder resin such as PFD and PTFE. Further, the upper limit of the temperature of the heat thus applied is preferably not higher than 650° C. if the substrate is a three-dimensional porous metal substrate made of metallic nickel. In particular, if the substrate is a three-dimensional porous metal substrate having a skeleton formed by plating such as foamed nickel, this temperature is desirable. This is because if the heating time is prolonged at a temperature higher than this temperature, it causes the denaturation of the substrate besides the denaturation and deformation of the active material filler, resulting in the drop of strength and electrical conductivity. Further, if nickel hydroxide is used, heating may be effected in the atmosphere. In this case, the facilities to be used can be simplified.

In a process, two of the solid heating members are allowed to come in contact with the substrate at a predetermined point so that the substrate is vertically sandwiched therebetween. This process makes it possible to apply heat to the active material filler in a short time. Accordingly, it is possible to minimize the effect of heat on other sites requiring no heating. Further, this process can apply heat uniformly in the vertical direction. Therefore, it is possible to effect uniform heat treatment of the active material filler and to make sure that the active material filler can be removed completely.

Further, after heat is applied, the ultrasonic vibration is applied to remove mainly the active material filler to the three-dimensional porous metal substrate on one vertical side. The active material filler is sucked therefrom on the other side via a predetermined time interval. This process is desirable because it can add a cooling effect, enhance the percent removal of the active material filler, and prevent the scattering of the active material filler.

Subsequently, since the retaining force has been reduced, the ultrasonic vibration is applied to the connecting site thus heated to remove the active material filler therefrom. The region of the substrate to which ultrasonic vibration is applied is preferably slightly greater than the region of the substrate to which heat has been applied, in order to cover the region of the substrate to which heat has been applied thereby leaving none of the active material thermally denatured behind. Thus, if a solid ultrasonic wave application device such as metallic horn is pressed against the substrate at a predetermined point to apply ultrasonic wave thereto, the surface of the solid ultrasonic wave application device in contact with the substrate is preferably greater than that of the solid heating member in contact with the substrate. The shape of the surface of the solid ultrasonic wave application device in contact with the substrate is preferably similar to that of the surface of the solid heating member in contact with the substrate for the purpose of reducing the extra area. Further, the shape of the collector member is preferably square in view of its production efficiency. Accordingly, the surface of the solid heating member in contact with the substrate is preferably square. Further, the surface of the solid ultrasonic wave application device in contact with the substrate is also preferably square. Moreover, the application of ultrasonic vibration is preferably effected while pressing the three-dimensional porous metal substrate to remove the active material filler efficiently. Further, the solid heating member is preferably allowed to come in contact with the substrate to an extent so that heat can be transferred to the substrate.

Further, a solid heating member also acting as an ultrasonic wave application member is desirable so that it can perform the application of heat and ultrasonic wave at the same time. Accordingly, it is possible to reduce the required number of steps. In this case, heat and an ultrasonic wave are applied simultaneously with the solid heating member being in contact with one vertical side of the three-dimensional porous metal substrate while the active material filler is sucked off at the other side. This process is preferable because it can enhance the percent removal of the active material thus released and prevent the scattering of the active material.

The foregoing treatment makes it possible to remove the active material filler efficiently or more completely and ensures that the connecting member is connected efficiently. Further, if a nickel hydroxide using a foamed plated three-dimensional porous nickel substrate is produced, the present embodiment can exert a remarkable effect on a structure having a porosity of not more than 30%, and more remarkably not more than 28%, after pressing. Thus, the use of the process of the present embodiment makes it possible to remarkably reduce the defect percentage. This effect becomes particularly remarkable when the porosity is not more than 28%.

EXAMPLE 2

The present embodiment will be further described in the following examples.

90 parts by weight of a particulate nickel hydroxide active material having an average particle diameter of 8 $\mu$m and 10 parts by weight of a particulate cobalt hydroxide having an average particle diameter of 6 $\mu$m were dispersed in a 0.4 wt-% aqueous solution of carboxymethyl cellulose to prepare a paste. The paste thus prepared was applied to a foamed nickel having a porosity of 95% (trade name: Cermet, produced by Sumitomo Electric Industries, Ltd.) so that the foamed nickel was filled with the paste. The foamed nickel was dried, and then pressed to almost half the original thickness to produce a nickel hydroxide electrode. The porosity of the electrode thus produced was 27%.

A collector tab made of nickel foil was then ultrasonically welded to the electrode according to this embodiment.

Figure 7A:
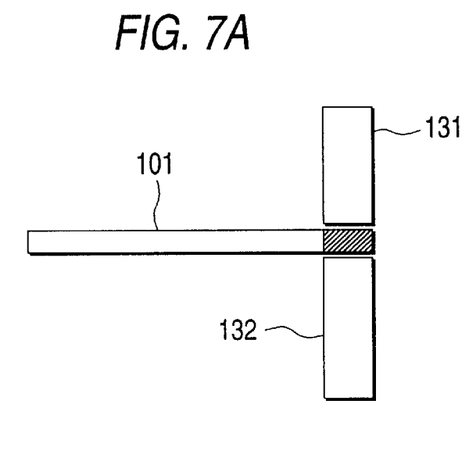
FIGS. 7A and 7B are diagrams illustrating the process of heating using a metallic trowel.
Figure 7B:
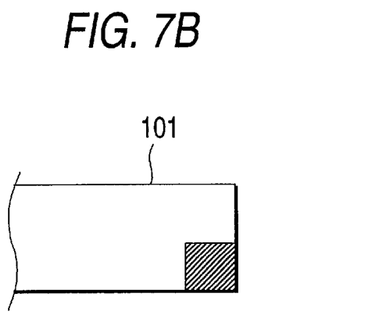
Figure 8A:
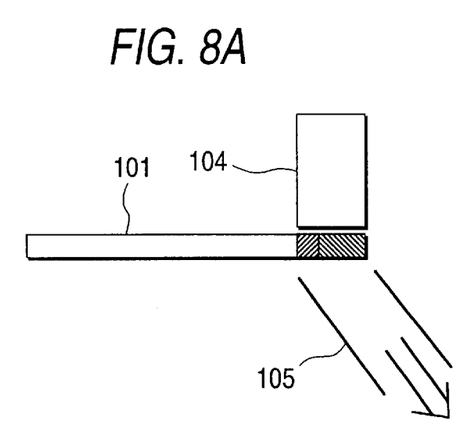
FIGS. 8A and 8B are diagrams illustrating the process of applying ultrasonic wave to remove an active material filler.
Figure 8B:
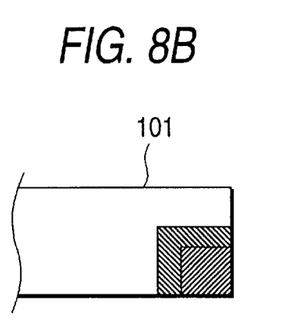

FIGS. 7A and 7B are diagrams illustrating the process, according to this embodiment, of heating using a metallic trowel as a solid heating member. FIGS. 8A and 8B are diagrams illustrating the process of applying an ultrasonic wave to remove an active material filler according to this embodiment. FIGS. 3A and 3B are schematic diagrams illustrating how the collector tab is attached according to this embodiment. FIGS. 1A, 2A and 3A each are a sectional view. FIGS. 1B, 2B and 3B each are a plan view of electrode. The present example will be further described in connection with these drawings.

In the present example, two metallic trowels 131, 132 were prepared. The metallic trowels 131, 132 were then allowed to come in contact with an electrode 101 at a predetermined point, shown by the shade, so that the electrode 101 (i.e., substrate) was vertically sandwiched therebetween. The surface of the metallic trowels 131, 132 which come in contact with the electrode 101 is planar and its shape is rectangle. The temperature of the forward end of the metallic trowels 131, 132 is 480° C. Under these conditions, the metallic trowels 131, 132 were allowed to come in contact with the electrode 101 in the air for 3 seconds. After the heat treatment, the color of the electrode thus treated changed from green to blackish at almost the same area having almost the same shape as the metallic trowel.

Thereafter, the electrode 101 was allowed to cool to room temperature. As shown in FIG. 8A, a Ti horn 104 was then pressed against the electrode 101 while applying an ultrasonic wave thereto. In this manner, the active material filler was removed from the electrode 101 while the electrode 101 was being compressed. During this procedure, the active material filler which had been released was sucked off through a vacuum suction port 105. The surface of the Ti horn 104 in contact with the electrode 101 is planar and almost square. In FIGS. 2A and 2B, the shade indicates the region of the electrode with which the Ti horn 104 is in contact, and the network indicates the region thus heated. In this manner, the region shown by the shade had a slight amount of the active material filler left therein, while the region shown by the network had a very clean foamed nickel skeleton fully free of active material filler.

Figure 9A:
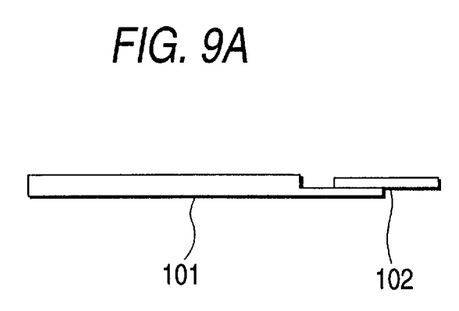
FIGS. 9A and 9B are schematic diagrams illustrating how the collector tab is attached.
Figure 9B:
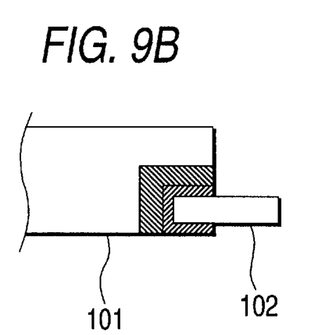

To the network region thus free of active material filler was ultrasonically welded a collector tab 102. For comparison, the active material filler was removed only by the application of ultrasonic wave, without the foregoing heat treatment. A collector tab was then connected to the electrode. Thereafter, the subsequent various conditions were optimized. The resulting comparative product was then measured for connecting strength of collector tab. The measurements were then compared with that of the product of the present example. As a result, the product of the present example showed a connecting strength three times that of the conventional product. The electrode obtained according to the present example was then assembled into a cell. As a result, the percentage of defects due to malconnection of collector tab was almost halved as compared with the conventional process. Further, the process of the present example made it possible to produce an electrode having a higher capacity and density than ever.

Further, the foregoing experimental procedure was followed except that the heating time was changed from 3 seconds to 30 seconds. As a result, almost the same connecting strength was obtained. Referring to the temperature of the metallic trowel, the highest connecting strength was obtained at a temperature range of from 400° C. to 500° C., provided that the heating time is fixed.

In accordance with the present embodiment, a collector member is rigidly connected to an electrode made of a three-dimensional porous metal substrate which is filled with an active material filler containing an active material with a minimized connecting energy such that the strength of the substrate is not reduced. Further, the energy required for the application of an ultrasonic wave during the removal of the active material is reduced from the conventional value. Moreover, the occurrence of a defect due to the failing of a collector member at the subsequent process of cell assembly is reduced. Further, heat treatment can be effected without damaging the substrate. The working process is safe and accurate dimensional control can be conducted for heat treatment.

Further, if the present embodiment is applied to the production of an electrode made of metallic nickel as a three-dimensional porous metal substrate filled with nickel hydroxide as a main active material, the effect of this embodiment can be exerted drastically because nickel hydroxide is subject to denaturation or deformation by oxidation. Thus, the substrate is little affected by heat. Further, as compared with the conventional removal process, using an ultrasonic wave alone, the substrate can be provided with a very clean surface after removal of the active material, although the reason is unknown.

Third Embodiment

In a process for the production of an electrode for a cell according to the first aspect of this embodiment, a three-dimensional porous metal substrate is filled with an active material filler containing an active material, heat is applied for denaturing or deforming mainly the active material filler to the substrate at a predetermined point as a result of a heat fluid being in contact therewith, an ultrasonic vibration is applied for removing mainly the active material filler on the substrate, and then a collector member is electrically connected to the substrate at the predetermined point where the active material filler has been removed.

The main concept of this embodiment is to apply heat to the three-dimensional porous metal substrate at a predetermined point so as to give a thermal deformation, or the like, to cause a change in the contact condition of the active material, or the like, to reduce the retaining force of the active material. Namely, heat is applied to the three-dimensional porous metal substrate or the active material filler so that the three-dimensional porous metal substrate thermally expands. Alternatively, at least one component of the active material filler is denatured or deformed to reduce the retaining force of the active material filler with respect to the three-dimensional porous metal substrate, so that it can be removed from the three-dimensional porous metal substrate by ultrasonic vibration. More effectively, the foregoing process is intended to denature or deform at least one component of the active material filler.

The thermal expansion of the three-dimensional porous metal substrate in this embodiment is similar to that of the second embodiment.

Concerning to an active material filler in this embodiment, it is similar to that of the second embodiment.

Regarding the order of applying heat and ultrasonic vibration, it is similar to that of the second embodiment.

In a process for the production of an electrode for cell according to the second aspect of this embodiment, heat is applied to cause the denaturation or deformation of mainly the active material filler on the substrate at a predetermined point from a heat fluid being in contact therewith. In other words, the process for producing an electrode for a cell according to the second aspect of this embodiment is characterized by a heating process. The use of a heat fluid makes it easy to apply a high temperature heat to the substrate and cope with a larger area to be treated in a larger electrode.

This embodiment will be further described with reference to an example of a nickel hydroxide electrode for a nickel-hydrogen cell, etc.

The three-dimensional porous metal substrate used in this embodiment is similar to that of the second embodiment.

The active material filler and a producing method thereof are similar to those of the second embodiment.

A collector member connected to the foregoing electrode is similar to that of the second embodiment.

In this embodiment, heat is applied to the substrate at a point where the collector member is connected in order to remove the active material filler. The region of the substrate to which heat is applied is preferably slightly greater than the connecting site of the collector member taking into account the margin for connection of the collector member. The application of heat can be accomplished by irradiating the substrate with infrared rays, a laser beam, or spraying a flame of a burner onto the substrate. Preferably, a heat fluid such as burner flame is used in this embodiment. Further, if a metallic nickel is used as the three-dimensional porous metal substrate and nickel hydroxide is used as the main active material, the heat fluid is preferably a flame of combustible gas. More preferably, the time during which the flame of combustible gas is allowed to come in contact with the substrate is not more than 15 seconds. In this case, even if the substrate used has a softening point of not higher than 700° C. and the flame used has a temperature of about 1,300° C., the substrate can neither lose its strength nor have unnecessary oxide layer formed thereon.

The temperature of the heat thus applied is similar to that of the second embodiment. However, in particular, the use of a flame of combustible gas makes it possible to minimize the effect on the substrate and give high temperature heat. Further, if the main active material is nickel hydroxide, heating may be effected in the atmosphere. In this case, the facilities to be used can be simplified.

Subsequently, ultrasonic vibration is applied to the connecting site thus heated to remove the active material filler, the retaining force of which has been reduced. The region of the substrate to which ultrasonic vibration is applied is preferably slightly greater than the region of the substrate to which heat has been applied to cover the region of the substrate to which heat has been applied and to leave none of the active material thermally denatured behind. Further, the foregoing heat treatment is preferably followed by the application of ultrasonic vibration via a predetermined time interval. Further, suction is preferably effected at the same time to enhance the percent removal of the active material thus released and to prevent scattering of the active material. In this case, it is preferred that ultrasonic vibration is applied to the three-dimensional porous metal substrate on one vertical side thereof while the active material filler is sucked off from the other side. The foregoing treatment makes it possible to remove the active material filler efficiently or more completely and ensures that the connecting member is connected efficiently.

Further, if a nickel hydroxide having a foamed plated three-dimensional porous nickel substrate is produced, this embodiment can exert a remarkable effect on a structure having a porosity of not more than 30%, and more remarkably not more than 28%, after pressing. Thus, the use of the process of the present embodiment makes it possible to remarkably reduce the defect percentage. This effect becomes particularly remarkable when the porosity is not more than 28%.

EXAMPLE 3

The present embodiment will be further described in the following examples.

A nickel hydroxide electrode is produced in the same manner as Example 2. The porosity of the electrode thus produced was 27%.

A collector tab made of nickel foil was then ultrasonically welded to the electrode by applying the present embodiment.

Figure 10:
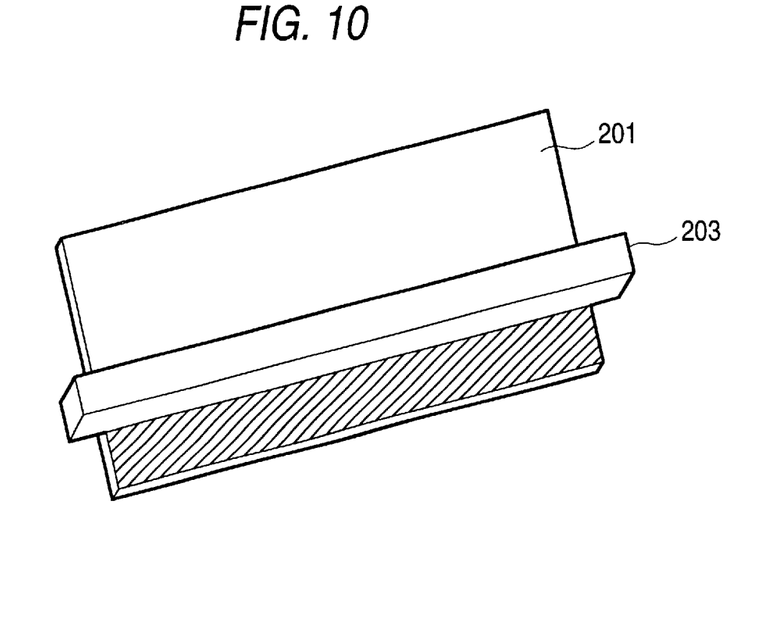
FIG. 10 is a diagram illustrating the process of allowing a heat fluid to come in contact with the substrate only at a predetermined point.
Figure 11:
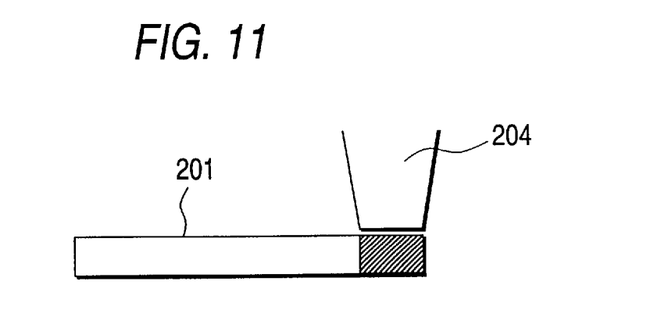
FIG. 11 is a diagram illustrating the process of applying an ultrasonic wave to remove the active material filler.
Figure 12:
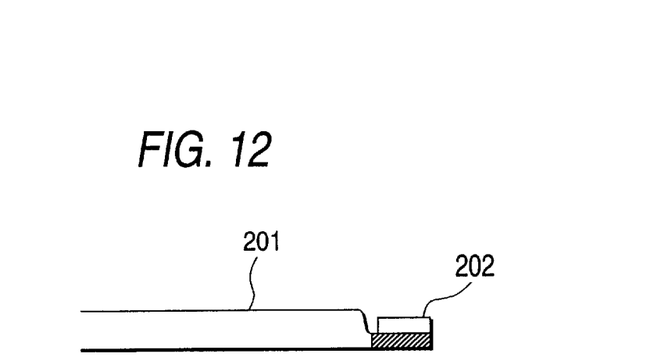
FIG. 12 is a schematic diagram illustrating how a collector tab is attached.

FIG. 10 is a diagram illustrating the process of allowing a heat fluid to come in contact with the substrate only at a predetermined point. FIG. 11 is a diagram illustrating the process of applying an ultrasonic wave to remove the active material filler. FIG. 12 is a schematic diagram illustrating how a collector tab is attached according to this embodiment. The present example will be further described in connection with these drawings.

As shown in FIG. 10, in order to allow a heat fluid to come in contact with the substrate only at a predetermined point, an iron square pillar rod 203 having a size of 3 mm×3 mm, which is greater than 30 times the thickness of an electrode 201, was placed on the electrode 201. The forward end of a flame of propane gas was allowed to come in contact with the portion shown by the shade at one point while being moved for 5 seconds so that the portion shown by the shade was entirely heated. This heat treatment caused the color of the treated portion to change from green to blackish at the area almost corresponding to the shape of the portion shown by the shade. The temperature of the forward end of the flame was 1,300° C. This treatment was effected in the atmosphere. Thus, in the production process of this embodiment, it is preferred that a metallic rod is placed on one vertical side of the three-dimensional porous metal substrate along the border of the region where the active material filler is denatured or deformed by the contact of the heat fluid with the region where the active material filler is not denatured or deformed by the contact of the heat fluid. In this manner, the active material cannot be damaged or dropped at extra points.

Thereafter, the electrode 201 was allowed to cool to room temperature. As shown in FIG. 11, a Ti horn 204 was then pressed against the electrode 201 while applying an ultrasonic wave thereto. In this manner, the active material filler was removed from the electrode 201 while the electrode 201 was being compressed. During this procedure, the active material filler which had been released was sucked off. The surface of the Ti horn 204 in contact with the electrode 201 is planar and rectangular. It is longer than the short side of the region shown by the shade in FIG. 10 but shorter than the long side of the region shown by the shade. The Ti horn 204 was repeatedly pressed against the substrate plural times while being moved longitudinally to remove the active material filler from the entire region. In this manner, the periphery of the region shown by the shade had a slight amount of the active material filler left therein while the region shown by the shade had got a very clean foamed nickel skeleton fully free of active material filler.

To the network region thus free of active material filler was then ultrasonically welded a collector tab 202. For comparison, the active material filler was removed only by the application of ultrasonic wave without the foregoing heat treatment. A collector tab was then connected to the electrode. Thereafter, the subsequent various conditions were optimized. The resulting comparative product was then measured for the connecting strength of the collector tab. The measurements were then compared with that of the product of the present example. As a result, the product of the present example showed a connecting strength three times that of the conventional product. The electrode obtained according to the present example was then assembled into a cell. As a result, the defect percentage due to malconnection of the collector tab was almost halved as compared with the conventional process. Further, the process of the present example made it possible to produce an electrode having a higher capacity and density than ever.

Figure 13:
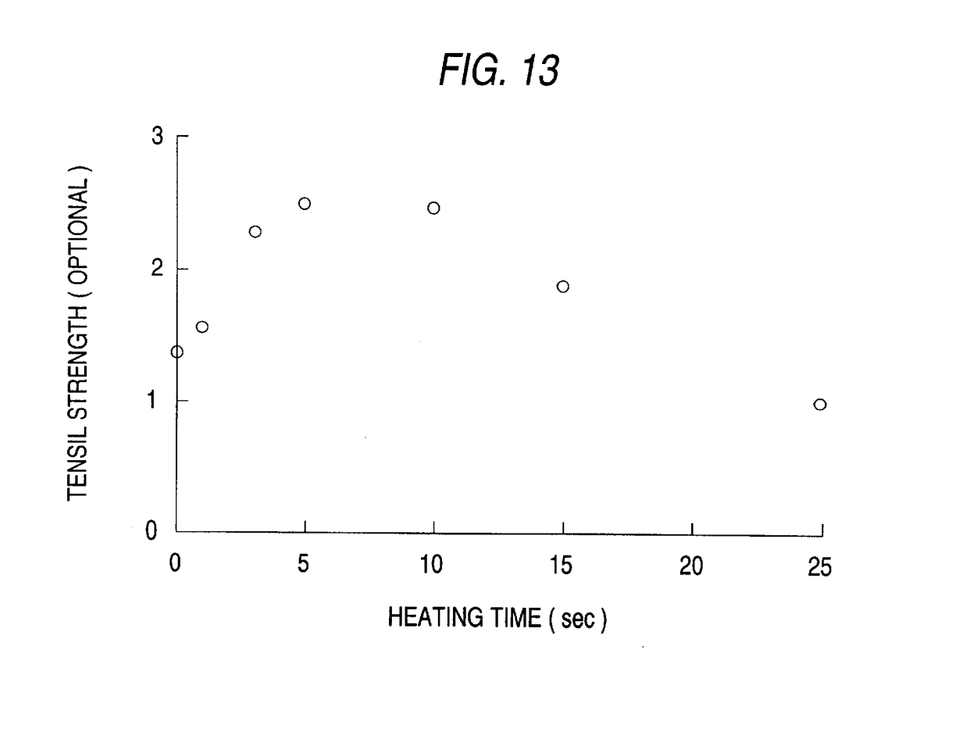
FIG. 13 is a graph illustrating the relationship between the heating time and the tensile strength.

FIG. 13 is a graph illustrating the relationship between the heating time and the tensile strength and shows the results of an examination of the tensile connecting strength of collector tab with different heating times for the same testing point in the present example. The results show that the time during which the flame of combustible gas comes in contact with the substrate is preferably not more than 15 seconds, more preferably not more than 10 seconds. It can be confirmed in these results that the active material filler can be completely removed in 3 seconds or longer. However, the active material filler cannot be completely removed in 1 second. Thus, it was found that the time during which the flame of combustible gas comes in contact with the substrate is preferably not less than 3 seconds, more preferably from not less than 5 seconds to not more than 10 seconds.

In accordance with this embodiment, a collector member is rigidly connected to an electrode made of a three-dimensional porous metal substrate filled with an active material filler containing an active material with a minimized connecting energy, without reducing the strength of the substrate. Further, the energy required for the application of the ultrasonic wave during the removal of the active material can be reduced from the conventional value. Moreover, the occurrence of a defect due to failing of collector member at the subsequent process of cell assembly can be reduced.

Further, if this embodiment is applied to the production of an electrode made of metallic nickel as a three-dimensional porous metal substrate filled with nickel hydroxide as a main active material, the effect of this embodiment can be exerted drastically because nickel hydroxide is subject to denaturation or deformation by oxidation. Thus, the substrate is little affected by heat. Further, as compared with the comparative removal process using an ultrasonic wave alone, the substrate can be provided with a very clean surface after removal of the active material, although the reason is unknown.

Fourth Embodiment

In this embodiment, a process for the production of an electrode for a cell is provided, wherein a three-dimensional porous metal substrate is filled with an active material filler containing an active material. Then, heat and an ultrasonic vibration is applied to cause the denaturation or deformation of the active material filler to the substrate at a predetermined point where a collector leading portion is formed to remove the active material filler.

The main concept of this embodiment is to apply heat to the three-dimensional porous metal substrate at a predetermined point so as to give a thermal deformation, or the like, causing the change in the contact condition of the active material, or the like, to reduce the retaining force of the active material. In other words, heat is applied to the three-dimensional porous metal substrate or the active material filler so that the three-dimensional porous metal substrate is thermally expanded. Alternatively, at least one component of the active material filler is denatured or deformed to reduce the retaining force of the active material filler with respect to the three-dimensional porous metal substrate, so that it can be removed from the three-dimensional porous metal substrate by ultrasonic vibration. More effectively, the foregoing process is intended to denature or deform at least one component of the active material filler.

Regarding the thermal expansion of the three-dimensional porous metal substrate according to this embodiment, it is similar to that of the second embodiment.

An active material filler used in this embodiment is similar to that of the second embodiment.

Concerning the order of applying heat and ultrasonic vibration, it is similar to that of the second embodiment.

This embodiment will be further described with reference to an example of nickel hydroxide electrode for nickel-hydrogen cell, etc.

The three-dimensional porous metal substrate used in this embodiment is similar to that of the second embodiment.

The active material filler used in this embodiment is similar to that of the second embodiment.

A collector member, such as collector tab made of nickel foil electrically connected to the foregoing electrode, is also similar to that of the second embodiment.

Figure 14:
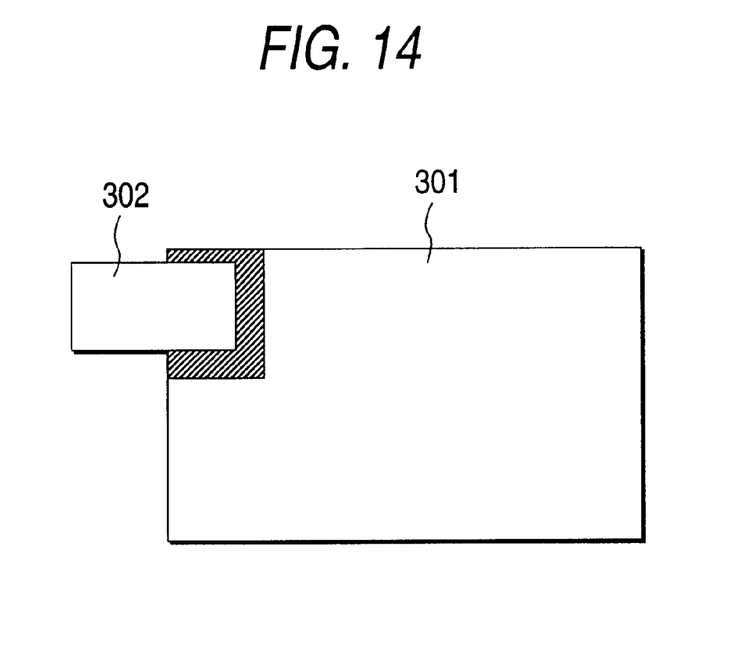
FIG. 14 is a schematic plan view of electrode illustrating an example of electrode structure having a collector tab attached thereto.

FIG. 14 is a schematic plan view of electrode illustrating an example of electrode structure having a collector tab attached thereto. In FIG. 1, the reference numeral 301 indicates an electrode produced by the foregoing process including coating, drying, and pressing. The reference numeral 2 indicates a collector tab. The shade indicates a point on the substrate which has been freed of active material filler. A process for the removal of the active material filler will be described hereinafter.

In this embodiment, heat is applied to the substrate at a point where the collector member is connected to remove the active material filler. The region of the substrate to which heat is applied is preferably slightly greater than the connecting site of the collector member taking into account the margin for connection of the collector member. The application of heat can be accomplished by irradiating the substrate with infrared rays, a laser beam, or spraying flames of a burner onto the substrate. The temperature of the heat thus applied is preferably such that the active material filler can be denatured or deformed. If a nickel hydroxide electrode, which contains nickel hydroxide as a main active material, is produced, the temperature of the heat thus applied is preferably not lower than 100° C., at which the water of crystallization can be removed, and more preferably not lower than 220° C., at which nickel hydroxide becomes nickel oxide. Alternatively, if the active material filler contains some resin, the temperature of the heat thus applied is even more preferably not lower than 250° C. This can apply when the active material filler contains a thickening agent such as CMC and MC or a binder resin such as PFD and PTFE. Further, the upper limit of the temperature of the heat thus applied is preferably not higher than 650° C. if the substrate is a three-dimensional porous metal substrate made of metallic nickel. In particular, if the substrate is a three-dimensional porous metal substrate made of a skeleton formed by plating such as foamed nickel, this temperature is desirable. This is because if the heating time is prolonged at a temperature higher than this temperature, it causes the denaturation of the substrate besides the denaturation and deformation of the active material filler, resulting in the drop of strength and electrical conductivity. Further, if nickel hydroxide is used, heating may be effected in the atmosphere. In this case, the facilities to be used can be advantageously simplified.

Subsequently, ultrasonic vibration is applied to the connecting site thus heated to remove the active material filler, the retaining force of which has been reduced. The region of the substrate to which ultrasonic vibration is applied is preferably slightly greater than the region of the substrate to which heat has been applied to cover the region of the substrate to which heat has been applied to leave none of the active material thermally denatured behind. Moreover, the application of ultrasonic vibration is preferably effected while pressing the three-dimensional porous metal substrate to remove the active material filler efficiently. Further, suction is preferably effected at the same time to enhance the percent removal of the active material thus released and to prevent the scattering of the active material. The foregoing treatment makes it possible to remove the active material filler efficiently or more completely and ensures that the connecting member can be connected efficiently.

A process for the production of an electrode for cell has been described which includes filling a three-dimensional porous metal substrate with an active material filler containing an active material, applying heat and an ultrasonic vibration causing the denaturation or deformation of the active material filler to the substrate at a predetermined point where a collector leading portion is formed to remove the active material filler so that the three-dimensional porous metal substrate is partially exposed, and then electrically connecting a collector member to the substrate at the predetermined point to effect collection of electricity from the exposed point. However, the use of this embodiment makes it possible to form a collector leading portion without connecting a collector member and hence produce an electrode for cell similar to that described above. This process will be further described hereinafter.

Figure 15:
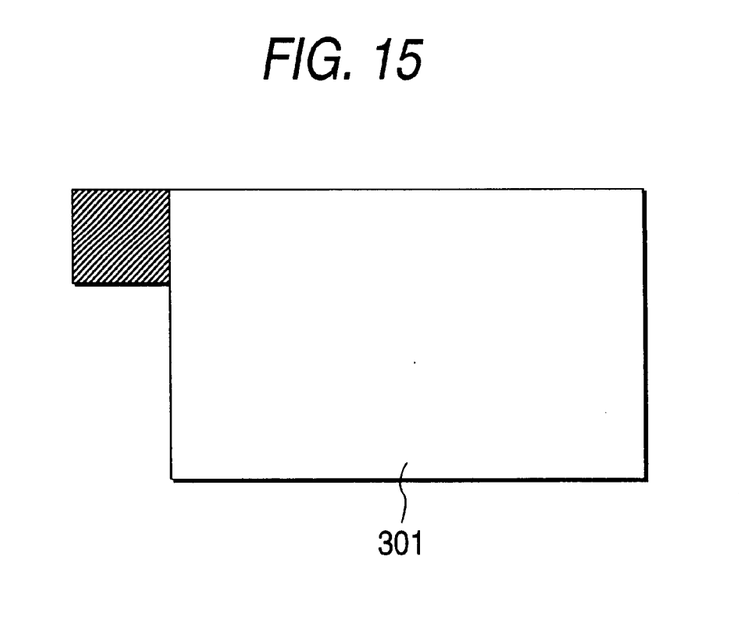
FIG. 15 is a schematic plan view of electrode illustrating an example of electrode structure having the same shape as one having a collector tab attached thereto.

FIG. 15 is a schematic plan view of electrode illustrating an example of electrode structure having the same shape as that having a collector tab attached thereto. In FIG. 2, the reference numeral 301 indicates an electrode produced by the foregoing process which includes coating, drying, and pressing as mentioned above. The shade indicates a point on the substrate which has been freed of active material filler. This portion acts as the foregoing collector tab. A process for the production of this electrode will be described hereinafter.

Firstly, coating, drying and pressing were effected in the same manner as mentioned above to produce an electrode having a rectangular ear portion (region shown by the shade) corresponding to collector tab portion as shown in FIG. 15. An electrode having such a shape can be produced by stamping out of an electrode parent body having a larger size obtained by coating, drying and pressing. Subsequently, the active material filler is removed from the ear portion in the same manner as mentioned above. In this manner, an electrode for a cell having the same function as that having the collector tab connected thereto can be produced without connecting a collector member.

The past study shows that the foregoing process for the production of an electrode having a collector leading portion which includes preparing a three-dimensional porous metal substrate filled with an active material filler, and then removing the active material filler from the substrate at a point where a collector leading portion is formed cannot be used for the actual production process. This is because the resulting electrode leaves something to be desired in strength, for example. However, it has been found that the use of the process of this embodiment involving the application of heat and ultrasonic vibration causing the denaturation or deformation of the active material filler instead of the conventional process of removing the active material filler makes it possible to put the foregoing process into use in the actual production. This is because the production process of this embodiment causes remarkably little damage on the three-dimensional porous metal substrate during the removal of the active material filler therefrom, and thus does not impair the strength of the metallic substrate. This is also because the surface of the metallic substrate thus freed of active material filler is very clean similarly to that of the collector member separately provided.

Further, if a nickel hydroxide using a foamed plated three-dimensional porous nickel substrate is produced, this embodiment can exert a remarkable effect on a structure having a porosity of not more than 30%, and more remarkably not more than 28%, after pressing. In other words, even when the porosity is greater than 30%, the percent occurrence of defects such as failing of a connecting member due to the reduction of connecting strength of connecting member can be reduced to that of this embodiment by properly adjusting the process conditions even if the conventional process using ultrasonic wave alone is used. However, as the packing density increases to reduce the porosity to the foregoing value, the conventional process cannot cope with the foregoing difficulties. Thus, the use of the process of this embodiment makes it possible to remarkably reduce the defect percentage. This effect becomes particularly remarkable when the porosity is not more than 28%.

In accordance with this embodiment, a collector member can be rigidly connected to an electrode having a three-dimensional porous metal substrate filled with an active material filler containing an active material with a minimized connecting energy, without reducing the strength of the substrate. Further, the energy required for the application of an ultrasonic wave during the removal of the active material can be reduced from the conventional value. Moreover, the occurrence of a defect due to the failing of the collector member at the subsequent process of cell assembly can be reduced.

Further, a collector leading portion can be formed without separately attaching a collector member.

Further, if this embodiment is applied to the production of an electrode containing metallic nickel as a three-dimensional porous metal substrate filled with nickel hydroxide as a main active material, the effect of this embodiment can be exerted drastically because nickel hydroxide is subject to denaturation or deformation by oxidation. Thus, the substrate is little affected by heat. Further, as compared with the conventional removal process using ultrasonic wave alone, the substrate can be provided with a very clean surface after removal of the active material, although the reason is unknown.

What is claimed is:

1. A process for the production of an electrode for cell, comprising the steps of:
    filling a three-dimensional porous metal substrate with an active material filler containing an active material;
    applying a heat for denaturing or deforming mainly said active material filler to said substrate at a predetermined point from a solid heating member being in contact therewith;
    applying an ultrasonic vibration for removing mainly said active material filler to said substrate to remove said active material filler; and
    electrically connecting a collector member to said substrate at said predetermined point where said active material filler has been removed.

2. The process for the production of an electrode for cell according to claim 1, wherein two of said solid heating member are prepared and said solid heating members are allowed to come in contact with said substrate at said predetermined point so that said substrate is vertically sandwiched between said two solid heating members.

3. The process for the production of an electrode for cell according to claim 1, wherein after said heating step, ultrasonic vibration is applied for removing mainly said active material filler to said three-dimensional porous metal substrate on one vertical side and said active material filler is sucked therefrom on the other side via a predetermined time interval.

4. The process for the production of an electrode for cell according to claim 1, wherein said solid heating member also acts as an ultrasonic wave application member to effect the application of heat and ultrasonic wave at the same time.

5. The process for the production of an electrode for cell according to claim 4, wherein said solid heating member is allowed to come in contact with said three-dimensional porous metal substrate on one vertical side thereof to effect the application of heat and ultrasonic wave at the same time; and
    wherein said active material filler is simultaneously sucked off said three-dimensional porous metal substrate on the other side.

6. The process for the production of an electrode for cell according to claim 1, wherein said three-dimensional porous metal substrate comprises metallic nickel; said main active material comprises nickel hydroxide; and a temperature of said solid heating member is from not lower than 100° C. to not higher than 650° C.

7. The process for the production of an electrode for cell according to claim 6, wherein the temperature of said solid heating member is from not lower than 250° C. to not higher than 650° C.

8. A process for the production of an electrode for cell comprising the steps of:
    filling a three-dimensional porous metal substrate with an active material filler containing an active material;
    applying heat for denaturing or deforming mainly said active material filler to said substrate at a predetermined point from a heat fluid being in contact therewith;
    applying an ultrasonic vibration for removing mainly said active material filler to said substrate to remove said active material filler; and
    electrically connecting a collector member to said substrate at said predetermined point where said active material filler has been removed.

9. The process for the production of an electrode for cell according to claim 8, wherein said three-dimensional porous metal substrate comprises metallic nickel; said main active material comprises nickel hydroxide; and said heat fluid is a flame of combustible gas.

10. The process for the production of an electrode for cell according to claim 9, wherein the time during which the flame is allowed to come in contact with said substrate is not more than 15 seconds.

11. The process for the production of an electrode for cell according to claim 8, wherein after said heating step, ultrasonic vibration is applied for removing mainly said active material filler to said three-dimensional porous metal substrate on one vertical side and the suction of said active material filler therefrom on the other side via a predetermined time interval.

12. The process for the production of an electrode for cell according to any one of claims 8 to 11, wherein a metallic rod is placed on one vertical side of said three-dimensional porous metal substrate along the border of the region where said active material filler is denatured or deformed by the contact of said heat fluid with the region where said active material filler is not denatured or deformed by the contact of said heat fluid.

13. A process for the production of an electrode for cell, comprising the steps of:
    filling a three-dimensional porous metal substrate with an active material filler containing an active material; and
    applying heat and an ultrasonic vibration in order to denature or deform said active material filler to said substrate at a predetermined point where a collector leading portion is formed to remove said active material filler, wherein a temperature of said substrate at said predetermined point to be heated is from not lower than 100° C. to not higher than 650° C.

14. The process for the production of an electrode for cell according to claim 13, wherein said three-dimensional porous metal substrate comprises metallic nickel and said main active material comprises nickel hydroxide.

15. The process for the production of an electrode for cell according to claim 14, wherein the temperature of said substrate at said predetermined point to be heated is from not lower than 250° C. to not higher than 650° C.

16. The process for the production of an electrode for cell according to any one of claims 13, 14 and 15, wherein an ultrasonic wave is applied to said three-dimensional porous metal substrate on one vertical side thereof while said active material filler is sucked off said three-dimensional porous metal substrate on the other side.

* * * * *